United States Patent Office 2,912,191
Patented Nov. 10, 1959

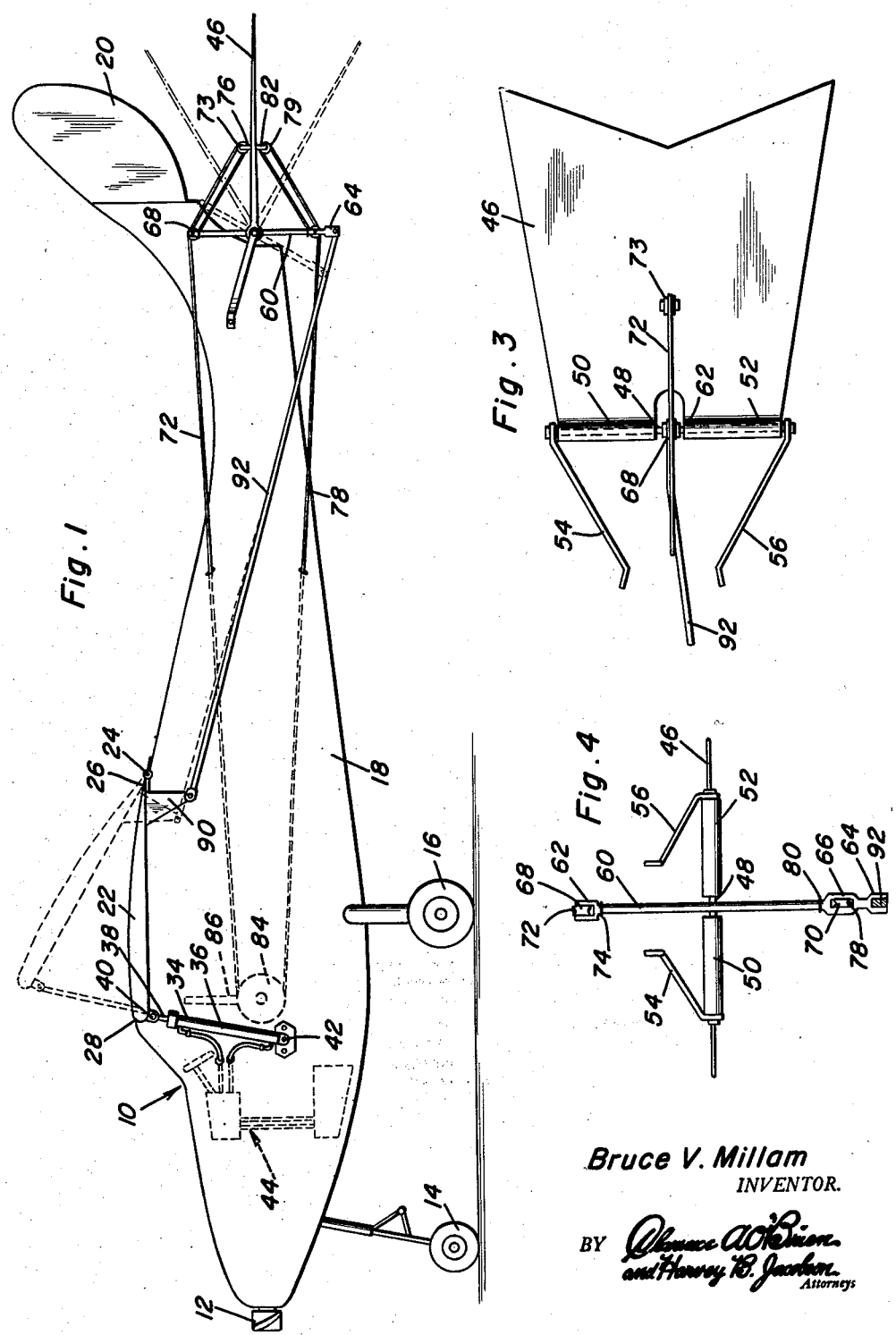

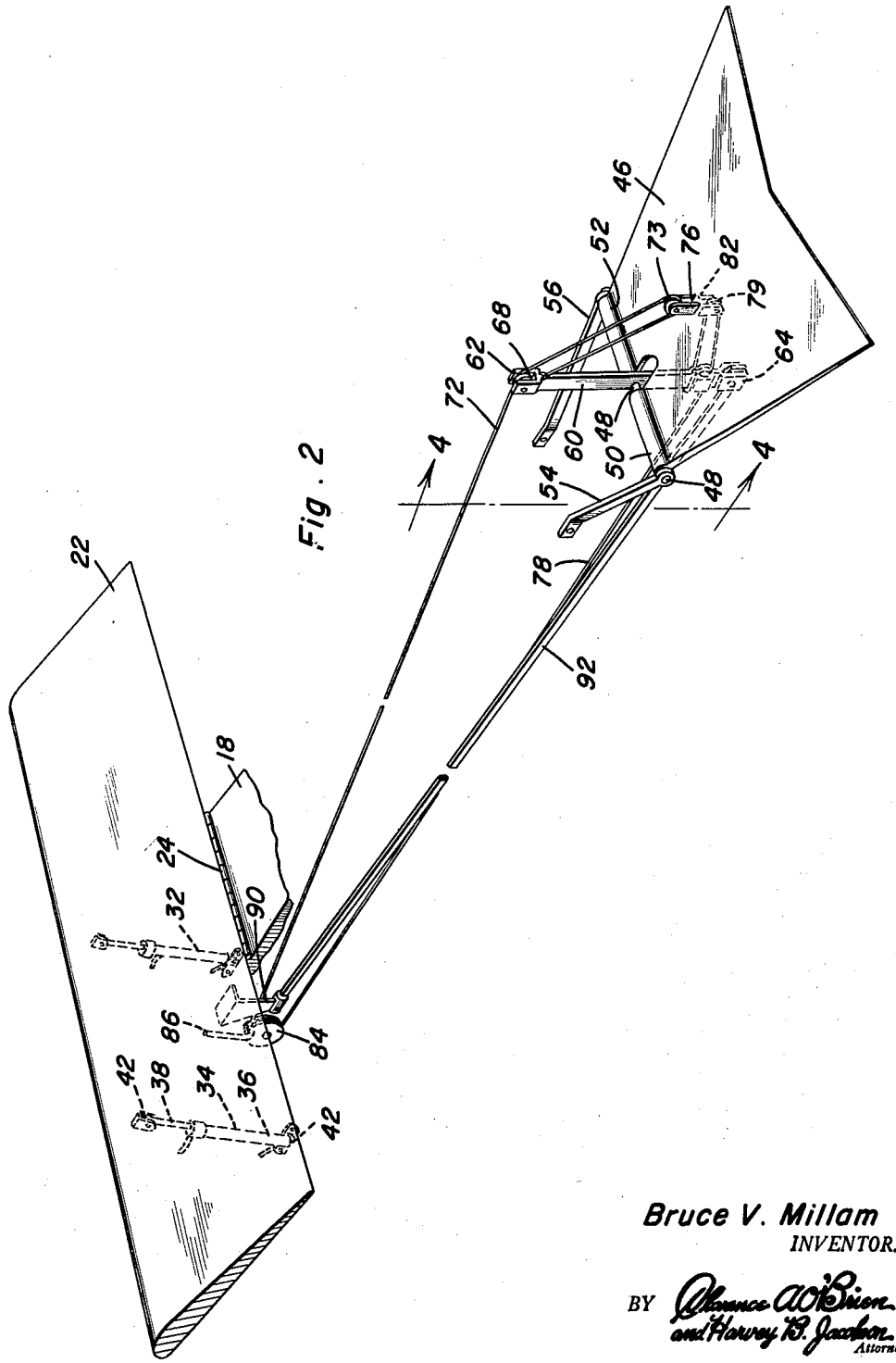

2,912,191

AIRCRAFT CONTROL SYSTEM

Bruce V. Millam, Dayton, Oreg.

Application September 28, 1956, Serial No. 612,648

2 Claims. (Cl. 244—48)

This invention relates to improvements in aircraft and particularly to improvements in the controls for an aircraft.

An object of the present invention is to provide an aircraft whose controls are so arranged that the aircraft is capable of lower landing speed and in shorter runways, a shorter take-off runway requirement, a quicker take-off, a rapid lift for short periods of time, particularly useful in downdrafts, greater turning capacity, larger maneuverability and ability to brake. A more specific object of the invention is to provide an interconnecting means for a tiltable wing, the latter being preferably mounted for pivotal movement near or at its trailing edge onto the fuselage, and the elevator so that there is a synchronous motion between the tilting movement of the wing and the elevator. It is an important feature of the invention to preserve separate and independent controls of the elevator when it is desired to actuate the same for normal flight operations without altering the angle of incidence of the wing.

Another object of the present invention is to provide an aircraft controlled system wherein there is an elevator and a wing, the latter being mounted for tilting movement on the fuselage, the aircraft control system having means to actuate the elevator in the customary manner and means interconnecting the wing to the elevator or some part of the elevator actuating means so that the elevator is tilted in response to positive control forces applied onto the wing in such direction as to tilt the wing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational side view of an aircraft which embodies the principles of the invention;

Figure 2 is a perspective view of a part of a wing and elevator together with the means interconnecting the two;

Figure 3 is a top plan view of the elevator of Figure 2; and

Figure 4 is a sectional view taken approximately on the line 4—4 of Figure 2.

In the accompanying drawings there is an aircraft 10 which is constructed in accordance with the principles of the invention. This aircraft includes standard equipment and includes many standard parts such as the propeller 12, engine (not shown), a nose wheel 14 and landing gear 16. This equipment operatively connected to fuselage 18 merely sets the environment for the invention and may be altered in accordance with the particular design of the aircraft on which the principles of the invention are practiced. This applies also to the rudder 20, the air foil section selected and other engineering matters.

There is a wing 22 operatively connected to the fuselage and among the operative connection parts is hinge 24 which is connected to the structure of the wing near or at trailing edge 26 thereof. The result is that leading edge 28 of wing 22 is capable of moving upwardly or downwardly in order to adjust the angle of incidence of the wing, that is the angle which the wing makes with the horizontal plane when the aircraft is at a rest position. The internal structure of the wing is conventional including ribs, stringers and the like.

There are means for adjusting the wing angle. Inasmuch as these means may assume any configurations, typical means are shown. These typical means consist of a pair of hydraulic motors 32 and 34, each motor comprising similar structure. For example motor 34 is made of a cylinder 36 in which there is a piston together with a piston rod 38. The piston rod is connected by means of a pivot 40 to the wing 22, preferably near the leading edge 28 thereof, while the cylinder 36 is connected by means of a pivot or mount 42 to a structural part of the fuselage. By extending and retracting the hydraulic motor wing 22 is pivotally adjusted as shown in dotted line in Figure 1. The means to actuate the hydraulic motors 32 and 34 are also of standard construction, consisting of hydraulic system 44 of the aircraft which is made in accordance with standard design.

Elevator 46 of the airplane may be of many forms depending upon the type of aircraft that is selected. In any case the front part of the elevator is mounted for pivotal movement on a hinge pin 48, and for this purpose the front part of the elevator is formed with sleeves 50 and 52 extending transversely of the longitudinal center line of the aircraft. A pair of arms 54 and 56 are connected at their outer ends to the ends of the hinge pin 48 and are connected at their inner ends to the fuselage. This mounts the hinge pin rigidly and firmly so as to establish a transverse pivot axis for the movement of the elevator 46.

Vertical post 60 is mounted pivotally on hinge pin 48 intermediate the ends thereof. This vertical post has an upper bifurcation 62 and a lower bifurcation 64. There is an eye 66 formed in post 60 near bifurcation 64. Upper pulley 68 is mounted for rotation in bifurcation 62 while lower pulley 70 is mounted for rotation on an axle in eye 66. Upper control cable 72 is entrained over the upper pulley 68, and idler pulley 73 and attached as at 74 to the upper end of post 60 near bifurcation 62. Idler pulley 73 is mounted on an axle that is carried by a mounting bracket 76 on the upper surface of elevator 46. Lower control cable 78 is entrained over lower pulley 70, idler pulley 79 and is attached as at 80 to post 60 near eye 66. Idler pulley 79 is mounted on mounting bracket 82 that is carried by the lower surface of elevator 46 and is located below bracket 76. Cables 72 and 78 may be made of one piece with the two described ends connected to post 60. In this event the intermediate part of the cable is connected to drum 84, the latter constituting a part of the means to adjust the angularity of the elevator 46. Drum 84 has a handle 86 connected therewith in an operative manner so as to rotate the drum and thereby cause actuation of the means to adjust elevator 46.

The aircraft that is shown in the drawing may be controlled in flight in a normal manner, that is, a manner similar to the ordinary aircraft now in flight and within common knowledge. But, there is the additional control provided by actuation of the fluid motors 32 and 34, these tilting wings 22. As this wing is tilted in order to change the angle that it makes with the oncoming air, the bracket 90 attached onto the bottom part of the wing 22 moves through an arc, and this causes link 92 to be actuated. The link has one end secured to the bracket 90 and has the other end secured in the bifurcations 64. The result is that each movement of wing 22 about hinge 24 will cause a corresponding movement of the post 60. The cables, both upper and lower will be adjusted with respect to their upper and lower pulleys 68 and 70 respectively thereby alter the position of the elevator 46 with which they are attached. However, due to the described construction, control of elevator 46 by actuation of lever 86 is preserved separate and apart from the movement of the elevator that is caused to occur in synchronism with movement of wing 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An aircraft control system comprising a wing, means mounting said wing for hinge movement so that the leading edge thereof is movable upwardly and downwardly, a link, means pivotally connecting one end of said link to the wing for movement in response to adjustment of said wing, an elevator, means mounting said elevator for pivotal movement, a post, said link being pivotally connected to said post in order to cause said post to be pivotally actuated in response to pivotal movement of said wing, a control for said elevator and including a cable having one part connected to said post and operatively connected to the upper surface part of said elevator and having another part connected to the lower surface of the elevator and to said post.

2. In an aircraft that has a wing capable of tilting to move the leading edge upwardly and downwardly and an elevator capable of moving upwardly and downwardly, the improvement comprising: means for synchronizing the movement of said elevator and said wing and including a link pivoted to said wing, a post mounted for pivotal movement on the aircraft, said link being pivotally connected to said post, control cables connected to said post at opposite ends thereof, means operatively connecting said control cables to the upper and lower parts respectively of said elevator, and said control cables being entrained over and guided by said post.

References Cited in the file of this patent
UNITED STATES PATENTS

| | | |
|---|---|---|
| 1,771,257 | Ingram | July 22, 1930 |
| 1,865,744 | Cornelius | July 5, 1932 |